Feb. 9, 1932. W. W. MOREY 1,844,820
MACHINE FOR CUTTING TYPE SPACERS
Original Filed Sept. 20, 1927 3 Sheets-Sheet 3
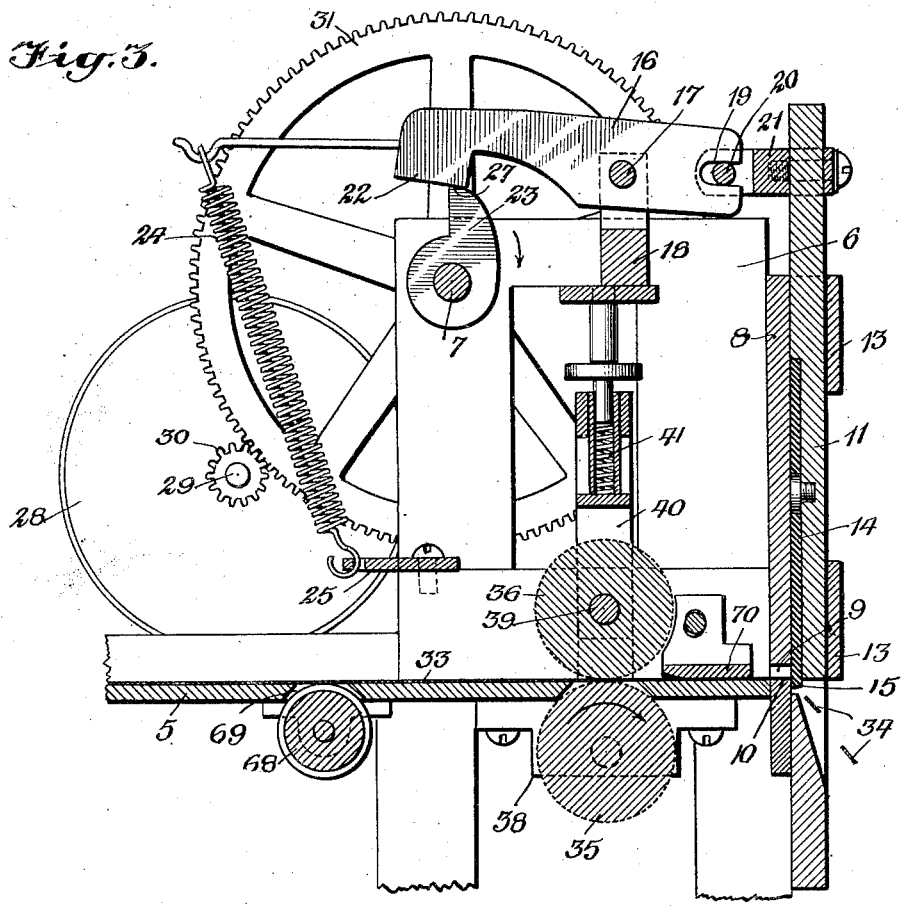
Fig. 3.
Fig. 4.
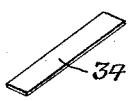
WITNESSES
INVENTOR
W. W. MOREY
BY
ATTORNEY Patented Feb. 9, 1932

1,844,820

UNITED STATES PATENT OFFICE

WALTER W. MOREY, OF EAST ORANGE, NEW JERSEY

MACHINE FOR CUTTING TYPE SPACERS

Application filed September 20, 1927, Serial No. 220,766. Renewed December 18, 1931.

This invention relates to a machine for cutting elements from a strip of metal and has particular reference to a machine which is designed for cutting type spacers from a strip of material.

At the present time in printing, lithographing and other similar establishments, type spacers for spacing type or justifying lines of type are ordinarily cut by hand from strips of paper which in addition to entailing a considerable amount of time, labor and expense, are not uniformly or accurately produced by hand methods.

The present invention comprehends a machine for cutting type spacers preferably from a strip of paper although the same may be employed for cutting metal spacers from metal strips, which machine functions to produce uniformly cut spacers in a more expeditious and efficient manner.

The invention further comprehends a machine of the character set forth which includes means for adjusting or regulating the width of the spacers to be cut thereby.

The invention furthermore aims to provide a machine which is comparatively simple in its construction and mode of operation, which is inexpensive to manufacture and operate, and which is highly efficient in its purpose.

With the above recited and other objects in view, reference is had to the following description and accompanying drawings in which there is exhibited one example or embodiment of the invention, while the appended claims define the actual scope of the invention.

In the drawings—

Fig. 3 is a longitudinal sectional view taken approximately on the line indicated at 3—3 in Fig. 2, and Fig. 4 is a perspective view of one of the type spacers produced by the machine.

Figure 1:
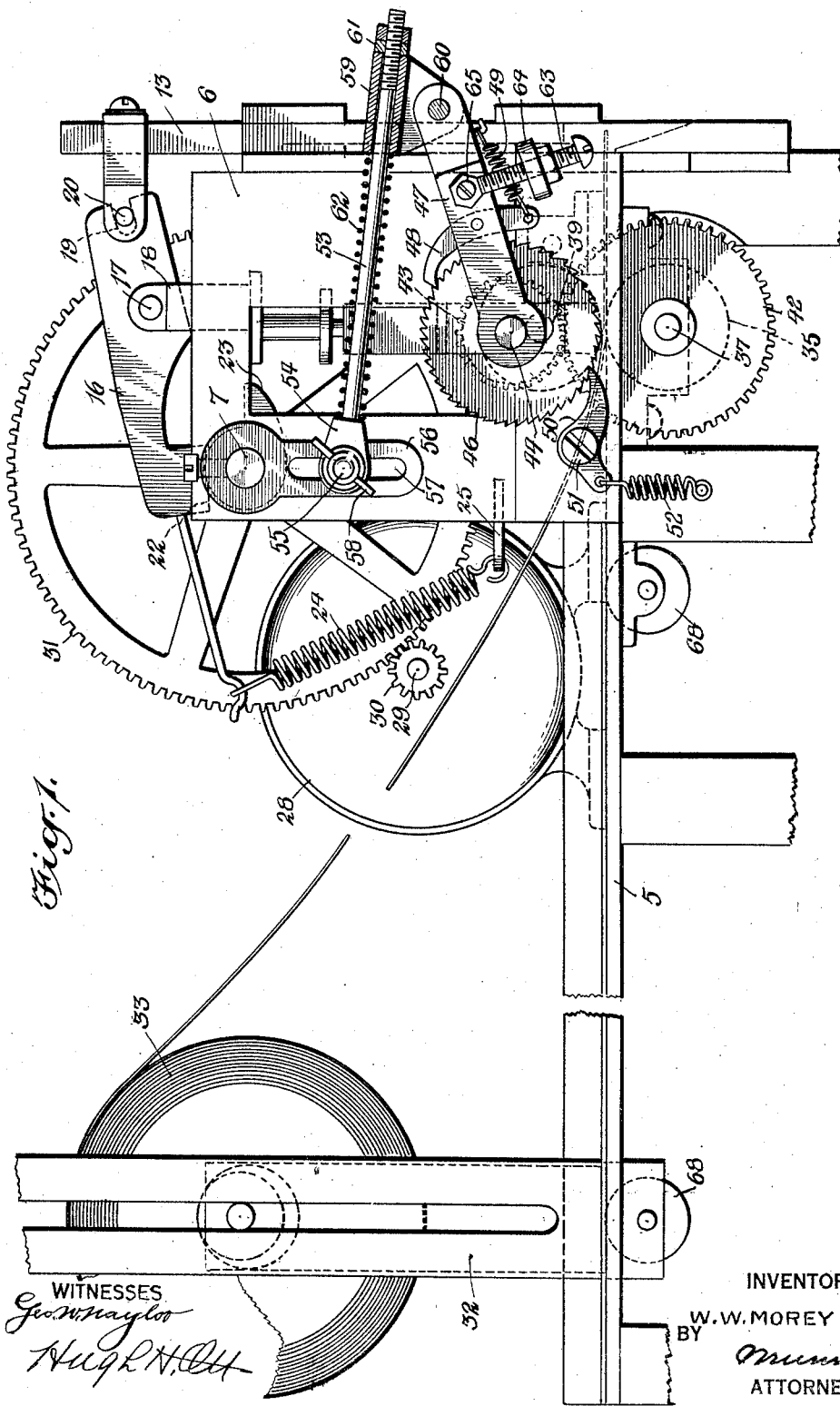
Figure 1 is a side view of the machine.
Figure 2:
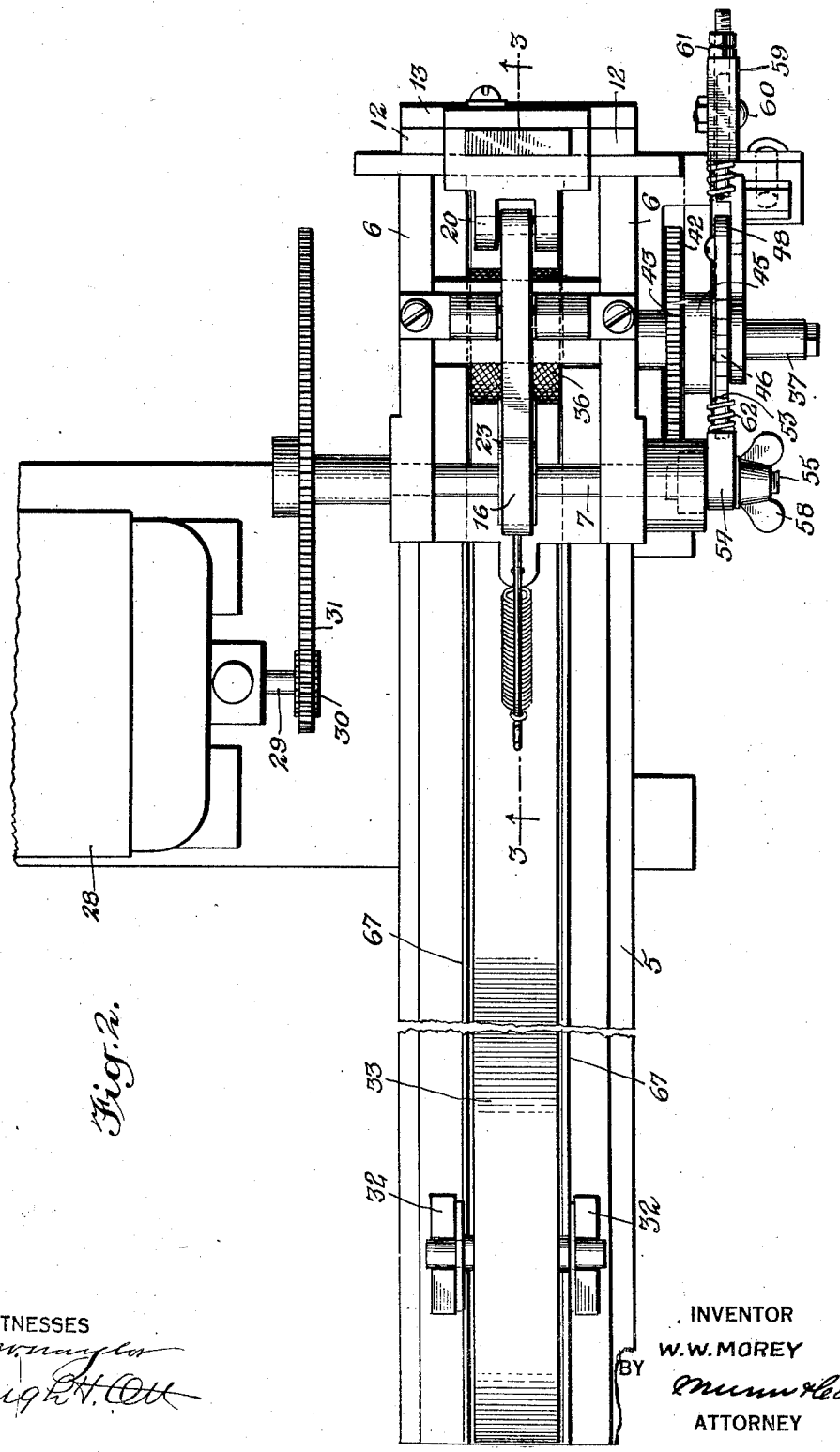
Fig. 2 is a plan view thereof.

Referring to the drawings by characters of reference, the machine includes a substantially elongated base 5 having laterally spaced upstanding frame portions 6—6 at one end in which a transverse rotary shaft 7 is journaled. At the outer end of the frame section and transversely of the machine is a vertical plate 8 formed with a slot 9 adjacent its lower end, the lower wall of the slot being disposed on the same horizontal plane with the upper surface of the base 5. A bar 11 is mounted for vertical reciprocation on the outer surface of the plate 8 between laterally spaced flange 12 and vertically spaced cross pieces. The bar 11 has detachably associated therewith a cutting or shearing element 14, the lower cutting edge 15 of which together with the lower wall 10 of the slot, serves as a shearing mechanism. Vertical reciprocation is imparted to the bar 11 by a rock arm 16 which is fulcrumed on a stub shaft 17 carried by a bearing bracket 18 supported by the frame portion 6. The rock arm is formed with a notch 19 at one end which engages a transverse pin 20 in the bifurcated head 21 on the upper end of the bar 11, the opposite end of the rock arm 16 being provided with a nose 22 which is engaged by a cam 23 secured to the shaft 7, for rotation therewith. Suitable means, such as a coiled contractile spring 24 has its opposite terminals connected respectively to the nose end 22 of the rock arm and to a stationary bracket 25 carried by the frame portions 6 for rocking and maintaining the nose 22 in engagement with the surface of the cam 23. It thus follows that the cam which is provided with a high point 27, will upon each revolution of the shaft 7, reciprocate the cutting or shearing element 14. The shaft 7 is driven in any suitable manner, such as by a motor 28, the shaft 29 of which is operatively connected to the shaft 7 by a gear and pinion 30 and 31.

At the other end of the base, supporting brackets 32 support a rolled strip 33 of material from which the type spacers 34 are to be cut, and the strip 33 is fed from the roll between the frame portions 6 and thence through the slot 9 in the plate 8. In order to provide means for feeding the strip 33 by and coincident with the mechanism for guiding the cutting or shearing element, a feed roller 35 and a pressure roller 36 are employed. The feed roller 35 is secured to a transverse shaft 37 journaled in bearings 38 and said feed roller is positively driven by the mechanism which will be hereafter described.

The pressure roller 36 is secured to a transverse shaft 39 which is journaled in a bearing element 40 normally forced downwardly under the influence of a spring 41. The function of the pressure roller 36 is to force and maintain the strip 33 in frictional contact with the periphery of the feed roller. The mechanism for driving the feed roller includes a gear 42 secured to the feed roller shaft 37 and a pinion 43 meshing therewith which is keyed to a stub shaft 44 journaled in a bearing 45. The shaft 44 has also keyed thereto a ratchet wheel 46 and said shaft has loosely mounted thereon a lever 47. The lever 47 has pivoted thereon a pawl 48 which is normally swung into engagement with the teeth of the ratchet wheel 46 by a spring 49. A dog 50 fulcrumed at 51 is disposed at a point substantially diametrically opposite the pawl 48 and by virtue of the spring 52 is thrown into engagement with the teeth of the ratchet wheel 46 to prevent retrograde movement of the ratchet wheel 46 when the lever 47 and the pawl 48 are being moved in a clockwise direction to obtain a fresh engagement with the ratchet wheel. The lever 47 is oscillated or swung in the direction to turn the feed roller 35 by a thrust rod 53 having a head 54 at one end which is connected to a crank pin 55 on a crank arm 56 secured to the rotary transverse shaft 7. The crank pin 55 is adjustable in a slot 57 in the crank arm 56 and is maintained in its radially adjusted position with respect to the shaft 7 by a thumb nut 58. The opposite end of the rod 53 extends through a bearing element 59 which is fulcrumed at 60 to the free end of the lever 47 and said terminal of the arm which protrudes through the bearing 59 is provided with an abutment 61. The means for oscillating or swinging the arm in the opposite direction to cause the pawl 58 to ratchet over the teeth of the ratchet wheel 46 to obtain a fresh grip, consists of a thrust spring 62 which is interposed between the head 54 of the rod and the bearing element 59. In order to adjust or regulate the thrust of the lever an adjustable abutment screw 63 is threaded through a bearing bracket 64 and the terminal of said abutment screw is disposed in the path of movement of an abutment lug 65 on the lever 47. It thus follows that by turning the abutment screw, the clockwise swinging movement of the lever 47 may be regulated so that the pawl 48 may engage one or more of the teeth of the ratchet 46 upon each movement, thereby permitting the feed roller to feed various lengths of the strip 33 through the slot 9. It will, of course, be understood that the thrust spring 62 when the machine is adjusted for smaller strokes, will allow the rod 53 to continue to move through the bearing element 59 after the lever 47 comes to rest by engagement of the abutment lug 65 with the abutment screw 63.

Where the strip 33 is of such a character that it cannot be fed from a roll, as, for instance, where the strip is of metal of such a gage that it cannot be rolled, lengths of the same are fed over the base between angle guides 67 and in order to overcome friction due to the movement of the strip over the base, anti-friction rollers 68 will be arranged at various longitudinally spaced points to extend through slots 69 in the base 5. The strip is also preferably guided under a guide foot 70 which is disposed over the base between the feed roller and the slot 9. It should also be noted that the peripheral surfaces of the feed and pressure rollers are preferably knurled or serrated to effect a more positive feed of the strip.

In operation it is obvious that each revolution of the shaft 7 effects a predetermined intermittent feed or projection of a predetermined length of the strip 33 through the slot 9, while an intermittent movement alternating with the feeding action, actuates the cutting or shearing element to sever from the strip the type spacers 34.

What is claimed is:

1. A feeding mechanism for type spacer cutting machines, comprising pressure and feed rollers, and means for intermittently turning the feed roller including a ratchet wheel operatively connected with the feed roller, an oscillatory arm having a ratchet pawl engageable with the ratchet wheel upon swinging movement of the arm in one direction and means for oscillating said arm, the means for oscillating said arm comprising a crank, a reciprocatory rod connected with the crank, a bearing element pivotally carried by the free end of the arm through which the rod is slidable, an abutment in one end of the rod for swinging the arm in one direction, and a spring surrounding said rod bearing against the bearing element and the opposite end of the rod for swinging the arm in the opposite direction and permitting of a further movement of the rod when the arm is at rest.

2. A feeding mechanism for type spacer cutting machines, comprising pressure and feed rollers, means for intermittently turning the feed roller, including a ratchet wheel operatively connected with the feed roller, an oscillatory arm having a ratchet pawl engageable with the ratchet wheel upon swinging movement of the arm in one direction and means for oscillating said arm, the means for oscillating said arm comprising a crank, a reciprocating rod connected with the crank, a bearing element pivotally carried by the free end of the arm through which the rod is slidable, an abutment in one end of the rod for swinging the arm in one direction and a spring surrounding said rod bearing against the bearing element and the opposite end of the rod for swinging the arm in opposite direction and permitting of a further movement of the rod when the arm is at rest, and an adjustable abutment element for regulating the retrograde swinging movement of said arm to vary the turning movement of the feed roller.

3. In a machine for cutting type spacers, a feeding mechanism including a feed roller, a ratchet wheel operatively connected therewith, means engaging the ratchet wheel for preventing retrograde movement of the feed roller, a lever having adjustably limited retrograde movement, a pawl carried thereby engageable with the ratchet wheel for turning the same in one direction upon oscillations thereof, and means for actuating said pawl carrying lever comprising a reciprocatory rod connected at one end to means for reciprocating the same, a bearing element for said rod pivotally carried by the said lever, through which bearing element the rod is axially slidable, an abutment at the free end of the rod for engagement with the bearing element to swing the lever in one direction and tensioned means between the connected end of the rod and said bearing element for swinging the lever in the opposite direction and for permitting further movement of the rod when the lever reaches the limit of its retrograde movement.

4. In a machine for cutting type spacers, a feeding mechanism including a feed roller, a ratchet wheel operatively connected therewith, means engaging the ratchet wheel for preventing retrograde movement of the feed roller, a lever, a pawl carried thereby and engageable with the ratchet wheel for turning the same in one direction upon oscillations of the lever, and reciprocatory means for oscillating said pawl carrying lever comprising an axially movable rod, a bearing element for said rod pivotally carried by the lever, through which bearing element the rod is axially slidable, an abutment at one end of the rod for engagement with the bearing to swing the lever in one direction, tensioned means between the rod and said bearing element for swinging the lever in the opposite direction and for permitting further movement of the rod when the lever is at rest and an abutment element adjustably mounted on the frame and engaging the lever for regulating the retrograde swinging movement thereof to vary the turning movement of the feed roller.

5. A mechanism for imparting intermittent turning motion to an element and adjustable to vary the turning motion imparted including a ratchet wheel operatively connected with said element, a lever fulcrumed coincident with the axis of the ratchet wheel, a spring pressed pawl carried by the lever and engageable with the ratchet wheel to turn the same upon swinging movement of the lever in one direction, adjustable means for limiting the swinging movement of the lever in the opposite direction and means for actuating the pawl carrying lever consisting of a reciprocatory rod connected at one end with means for reciprocating the same, a bearing element for said rod pivotally carried by the free end of said lever and through which bearing element the rod is axially slidable, an abutment at the free end of the rod for engagement with the bearing element to swing the lever in a direction to turn the ratchet wheel and tensioned means carried by the rod and acting upon the bearing element for swinging the lever in the opposite direction whereby to permit of further movement of the rod when the lever engages with the adjustable limiting means.

Signed at New York, in the county of New York and State of New York, this 19th day of September, A. D. 1927.

WALTER W. MOREY.